US012719948B2

(12) United States Patent
Ezrielev et al.

(10) Patent No.: US 12,719,948 B2
(45) Date of Patent: Aug. 25, 2026

(54) EDGE AUGMENTED GENERATION FOR DISTRIBUTED SYSTEMS WITH SUBNETS OF SELECTED EDGE DEVICES

(71) Applicant: Dell Products L.P., Round Rock, TX (US)

(72) Inventors: Ofir Ezrielev, Be'er Sheva (IL); Lev Makler, Be'er Sheva (IL); Yehonatan Cohen, Ashdod (IL)

(73) Assignee: Dell Products L.P., Round Rock, TX (US)

( * ) Notice: Subject to any disclaimer, the term of this patent is extended or adjusted under 35 U.S.C. 154(b) by 50 days.

(21) Appl. No.: 19/035,118

(22) Filed: Jan. 23, 2025

(65) Prior Publication Data

US 2026/0214139 A1 Jul. 23, 2026

(51) Int. Cl.
*G06F 15/16* (2006.01)
*H04L 67/10* (2022.01)

(52) U.S. Cl.
CPC .................................... *H04L 67/10* (2013.01)

(58) Field of Classification Search
CPC ........................................................ H04L 67/10
See application file for complete search history.

(56) References Cited

U.S. PATENT DOCUMENTS

| | | | | |
|---|---|---|---|---|
| 10,664,527 | B1 | 5/2020 | Henderson et al. | |
| 11,347,783 | B2 | 5/2022 | Kraus et al. | |
| 12,177,692 | B1 | 12/2024 | Savaris | |
| 2025/0005051 | A1 | 1/2025 | Khosla | |
| 2025/0068438 | A1 * | 2/2025 | Guzman | G06F 8/65 |
| 2025/0103965 | A1 * | 3/2025 | Kumar | G06N 3/006 |
| 2026/0030273 | A1 * | 1/2026 | Ogisu | G06F 16/33295 |
| 2026/0050590 | A1 * | 2/2026 | Gao | G06F 16/245 |

OTHER PUBLICATIONS

Nguyen et al. (Sep. 5, 2024). "An Ontology-based-RAG System using Graph for accurate analytics—A dynamic way to combine information from documents with structured data to drive insights using AGE". Medium. Max.AI Tech Blog. Retrieved from <https://medium.com/max-ai-tech-blog/building-a-graph-based-rag-system-using-apache-age-98e0ac7f9589#:~: text=This%20is%20where%20Ontology%2Dbased, the%20ontology%20and%20data%20grow> on Jan. 28, 2025 (9 pages).

(Continued)

*Primary Examiner* — Normin Abedin
(74) *Attorney, Agent, or Firm* — WOMBLE BOND DICKINSON (US) LLP

(57) ABSTRACT

Methods and systems for managing operation of a distributed system are disclosed. The operation may be managed by using subnets of selected edge devices and/or the selected edge devices to generate a final response to a prompt. The prompt may be transmitted through the subnets to the selected edge devices. The selected edge devices may be selected from edge devices of the subnets using processes that include (i) information elimination, (ii) elimination validation, (iii) selection refinement, and/or (iv) any other process used to determine the selected edge devices. Sub-responses to derived prompts may be generated by the subnets and/or the selected edge devices. At least a portion of the sub-responses may be transmitted to the management system. The management system may obtain the final response from the at least the portion of the sub-responses.

20 Claims, 8 Drawing Sheets

(56) References Cited

OTHER PUBLICATIONS

Toro et al. (Dec. 18, 2023). "Dynamic Retrieval Augmented Generation of Ontologies using Artificial Intelligence (DRAGON-AI)". arXiv:2312.10904. Retrieved from <https://arxiv.org/abs/2312.10904> on Jan. 28, 2025 (31 pages).
Kommineni et al. (Mar. 13, 2024). "From human experts to machines: An LLM supported approach to ontology and knowledge graph construction". arXiv:2403.08345v1. Retrieved from <https://arxiv.org/pdf/2403.08345v1> on Jan. 28, 2025 (10 pages).
Barron et al. (Oct. 3, 2024). "Domain-Specific Retrieval-Augmented Generation Using Vector Stores, Knowledge Graphs, and Tensor Factorization". arXiv:2410.02721. Retrieved from <https://arxiv.org/pdf/2410.02721> on Jan. 28, 2025 (8 pages).
Palantir. (n.d.) "Ontology building/Ontology Manager/Overview". Retrieved from <https://www.palantir.com/docs/foundry/ontology-manager/overview> on Jan. 28, 2025 (10 pages).
Mousavi et al. (Oct. 2, 2024). "DyKnow: Dynamically Verifying Time-Sensitive Factual Knowledge in LLMs". arXiv:2404.08700. Retrieved from <https://arxiv.org/pdf/2404.08700> on Jan. 28, 2025 (16 pages).
Huang et al. (Nov. 30, 2023). "VTimeLLM: Empower LLM to Grasp Video Moments". arXiv:2311.18445. Retrieved from <https://arxiv.org/pdf/2311.18445> on Jan. 28, 2025 (14 pages).
Steve Tueno. (Sep. 23, 2024). "Natural Language Query Engine for Relational Databases using Generative AI". arXiv:2410.07144v1. Retrieved from <https://arxiv.org/pdf/2410.07144> on Jan. 28, 2025 (18 pages).
Jaime Hernández. (Aug. 15, 2024). "Enhancing SQL Query Generation with Large Language Models (LLMs): My Learning Journey". Medium. Retrieved from <https://devjaime.medium.com/enhancing-sql-query-generation-with-large-language-models-llms-my-learning-journey-81f116646314> on Jan. 28, 2025 (4 pages).
Michiardi et al. (May 22, 2018). "Cache-based Multi-query Optimization for Data-intensive Scalable Computing Frameworks". arXiv:1805.08650. Retrieved from <https://arxiv.org/pdf/1805.08650> on Jan. 28, 2025 (14 pages).
Khodak et al. (May 2, 2024). "Learning to Relax: Setting Solver Parameters Across a Sequence of Linear System Instances". arXiv:2310.02246. Retrieved from <https://arxiv.org/pdf/2310.02246> on Jan. 28, 2025 (33 pages).
Niels de Jong (Jul. 13, 2023). "NeoDash 2.3—Create Graph Dashboards With LLM-Powered Natural Language Queries". Medium. Neo4j Developer Blog. Retrieved from <https://medium.com/neo4j/neodash-2-3-create-graph-dashboards-with-llm-powered-natural-language-queries-348cf4dec583> on Jan. 28, 2025 (7 pages).
Li et al. (Feb. 1, 2024). "PAP-REC: Personalized Automatic Prompt for Recommendation Language Model". arXiv:2402.00284v1. Retrieved from <https://arxiv.org/pdf/2402.00284> on Jan. 28, 2025 (24 pages).
Malak et al. (May 14, 2024). "Multi-Server Multi-Function Distributed Computation". arXiv:2405.08732. Retrieved from <https://arxiv.org/pdf/2405.08732> on Jan. 28, 2025 (28 pages).
Informatica. (Apr. 2021). "Creating an Automatic Relational Database Subscription". Retrieved from <https://docs.informatica.com/data-integration/data-integration-hub/10-5/getting-started/creating-subscriptions/creating-an-automatic-relational-database-subscription.html> on Jan. 28, 2025 (2 pages).

* cited by examiner

EDGE AUGMENTED GENERATION FOR DISTRIBUTED SYSTEMS WITH SUBNETS OF SELECTED EDGE DEVICES

FIELD

Embodiments disclosed herein relate generally to managing operation of a distributed system. More particularly, embodiments disclosed herein relate to using subnets of selected edge devices and/or the selected edge devices to generate a final response to a prompt.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1A:
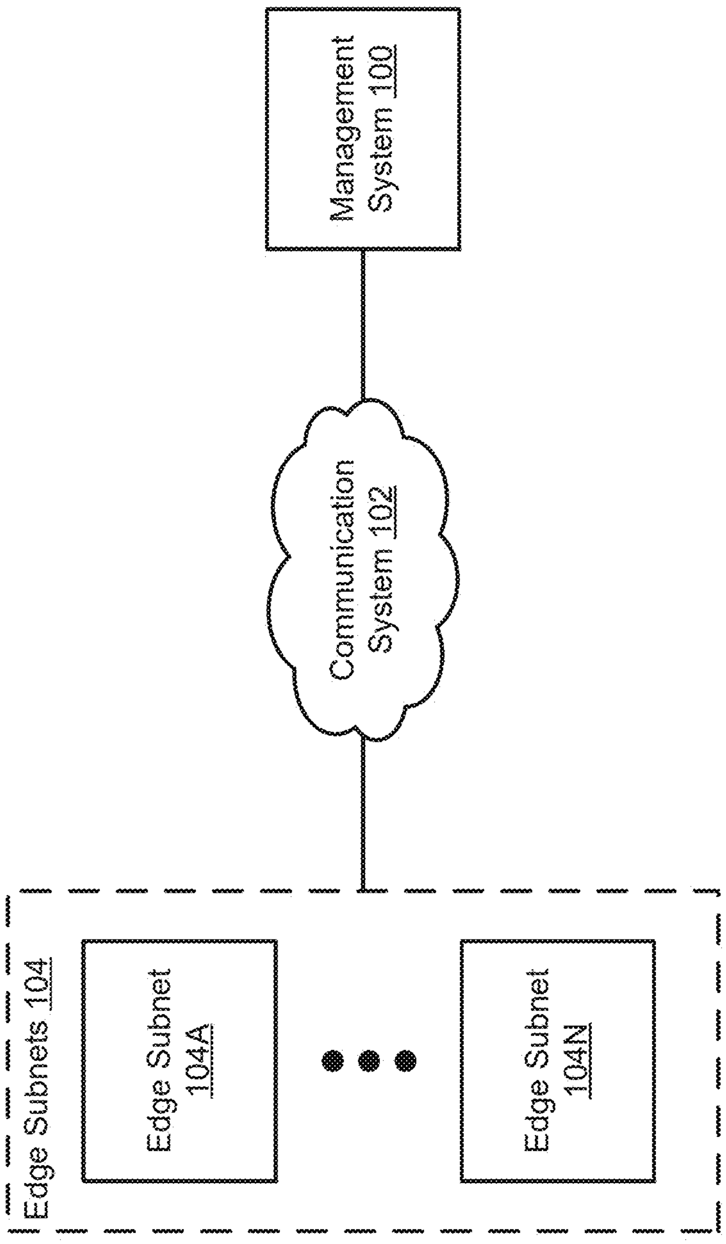
FIGS. 1A-1B show diagrams illustrating a distributed system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to managing operation of a distributed system. The operation may be managed by using subnets of selected edge devices and/or the selected edge devices to generate a final response to a prompt.

During the operation, a first prompt may be received by a management system of the distributed system. The first prompt may include an input, such as (i) a query, (ii) a request, (iii) an instruction, (iv) a validation, and/or (v) any other type of input used to interact with the distributed system. At least one second prompt may be generated, using at least the first prompt, by a first generative trained machine learning model. The at least one second prompt may include similar content and/or different content compared to the first prompt and/or therefore utilize (i) at least one first attribute, (ii) at least one first capability, (iii) first information, and/or (iv) any other first data of at least one subnet of the distributed system.

The management system may initiate a first retrieval augmented generation (RAG) processing by transmitting the first prompt and/or the at least one second prompt to the at least one subnet. The at least one subnet may continue the first RAG by generating, using at least the first prompt and/or at least the at least one second prompt, at least one third prompt by a second generative trained machine learning model. The at least one third prompt may include the similar content and/or the different content compared to the first prompt and/or to the at least one second prompt and/or therefore utilize (i) at least one second attribute, (ii) at least one second capability, (iii) second information, and/or (iv) any other second data of at least one edge device of the distributed system.

The at least one subnet may continue the first RAG processing by transmitting the first prompt and/or the at least one second prompt and/or the at least one third prompt to at least one selected edge device. The at least one selected edge device may continue the first RAG by generating, using (i) the at least the first prompt, (ii) the at least one second prompt, (iii) the at least one third prompt, and/or (iv) local information of the at least one selected edge device, a first response using a third generative trained machine learning model.

The at least one selected edge device may be selected by generating a catalog of the at least one selected edge device. To generate the catalog, at least one historical response of the at least one edge device of at least one subnet may be analyzed. The at least one historical response may have been, at an earlier time, generated by the at least one edge device in response to a historical prompt selected by the at least one subnet. The analysis may include (i) comparing data chunks of the at least one historical response, (ii) performing an information elimination on the data chunks, (iii) validating the information elimination of the data chunks, and/or (iv) selecting a second at least one edge device, based on the information elimination and/or the validation, to generate the catalog of the at least one selected edge device.

The catalog may be refined to generate a second catalog. The catalog may be refined by including a third at least one edge device with the at least one selected edge device in the catalog to generate the second catalog. The second catalog may include therefore a second at least one selected edge device. The second at least one selected edge device may, using a prompt, (i) generate responses that include non-redundant information and/or minimally redundant information and/or (ii) use available computational resources to perform RAG processing.

By using the at least one selected edge device and/or the second at least one selected edge device, (i) duplicative processing by the edge devices may be mitigated and/or eliminated, (ii) unnecessary consumption of computational resources due to the duplicative processing may be prevented, and/or (iii) a quality and/or reliability of an output, generated by a generative trained machine learning model using a response from the at least one selected edge device and/or the second at least one selected edge device, may be improved.

The least one subnet may continue the first RAG processing by receiving, from the at least one selected edge device and/or the second at least one selected edge device, each first response of the at least one selected edge device and/or of the second at least one selected edge device to obtain a plurality of first responses. The plurality of the first responses may be ranked based on a first ranking criteria (e.g., first keyword use and/or first keyword frequency, any magnitude of relevancy to the first prompt and/or the at least one second prompt, and/or any other first criterium) to generate a ranked plurality of first responses. The plurality of the first responses may be ranked by generating, using (i) the first prompt. (ii) the at least one second prompt, and/or (iii) the first ranking criteria, the ranked plurality of the first responses using the second generative trained machine learning model.

The management system may perform a second RAG processing by (i) receiving at least a portion of the ranked plurality of the first responses and/or (ii) obtaining a final response to the first prompt. The final response may be obtained by (i) generating, using the first prompt and/or the at least the portion of the ranked plurality of the first responses, the plurality of final responses using the first generative trained machine learning model, and (ii) ranking the plurality of the final responses, using the first prompt and/or a second criteria, to generate the ranked plurality of the final responses using the first generative trained machine learning model. The second ranking criteria may include (i) a second keyword use and/or second keyword frequency, (ii) any magnitude of second relevancy to the first prompt, and/or (iii) any other second criterium. The final response to the prompt may include at least one of the ranked plurality of the final responses. The final response may be used by the management system to provide computer implemented services.

In an embodiment, a method for managing operation of a distributed system is disclosed. The method may include, based on a determination that a management system of the distributed system lacks sufficient information regarding edge devices of the distributed system to service a prompt submitted for processing by a first generative trained machine learning model hosted by the management system: (i) obtaining, by the management system and using the prompt, a plurality of second prompts for subnets of the distributed system, each of the subnets comprising a subnet manager and at least one of the edge devices, (ii) initiating, by the management system, first retrieval augmented generation (RAG) processing of the plurality of the second prompts by the subnets using locally available data hosted by a sub-portion of portions of the edge devices that are members of each of the subnets, the sub-portion being deemed likely to provide unique responses to respective subnet managers of the subnets as part of the first RAG processing, and the locally available data being used as knowledge sources for the first RAG processing to obtain a plurality of first responses from the subnets, (iii) performing, by the management system, second RAG processing of the prompt using the plurality of the first responses as a knowledge source for the second RAG processing to obtain a final response, and (iv) providing, by the management system, computer implemented services using the final response.

A likelihood to provide the unique responses may be based on historic responses provided by the sub-portion of the portions of the edge devices.

The sub-portion to provide the unique responses may also be based on computing resources availability of the portions of the edge devices so that any of the edge devices lacking a threshold level of available computing resources are not members of the sub-portion.

Each first response of the plurality of first responses may be obtained from a corresponding one of the respective subnet managers of the subnets, and each of the respective subnet managers are adapted to use the sub-portion of the portions of the edge devices to generate a corresponding first response of the plurality of first responses.

The respective subnet managers may be further adapted to verify operation of the sub-portion of the portions of the edge devices by obtaining a response from at least one edge device of the edge devices that is deemed likely to provide a duplicative response to a response provided by an edge device of the sub-portion of the portions of the edge devices as part of the first RAG processing.

Initiating the first RAG processing may include providing, by the management system, the plurality of the second prompts to respective subnet managers of the subnets to initiate generation and distribution of derived prompts to portions of the edge devices that are members of the subnets.

The subnet manager may be adapted to customize each of the derived prompts based on a designated recipient of each of the derived prompts.

The subnet manager may be further adapted to obtain sub-responses based on the derived prompts and generate one of the plurality of the first responses.

The one of the plurality of first responses may be based on a ranking of the derived prompts performed by the subnet manager based on ranking criteria that is different from other ranking criteria used by edge devices that are managed by the subnet manager.

Performing the second RAG processing may include (i) rank ordering the plurality of first responses based on relevancy to the prompt, and (ii) using a portion of the plurality of the first responses as indicated by the rank ordering as context data for the prompt.

In an embodiment, a non-transitory media is provided. The non-transitory media may include instructions that when executed by a processor cause the computer-implemented method to be performed.

In an embodiment, a data processing system is provided. The data processing system may include the non-transitory media and a processor, and may perform the computer-implemented method when the computer instructions are executed by the processor.

Figure 1B:
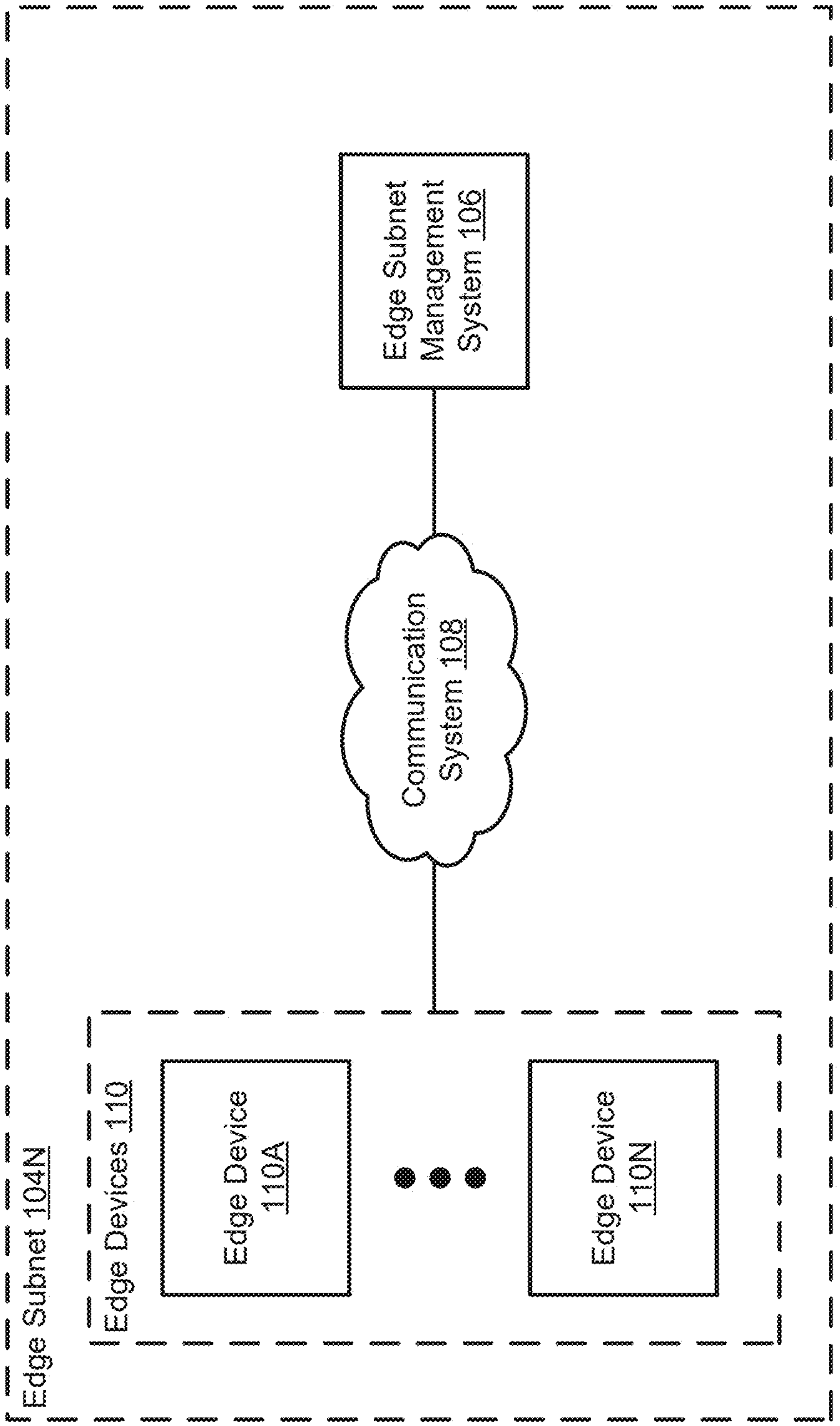

Turning to FIGS. 1A-1B, a distributed system in accordance with an embodiment is shown. The distributed system may provide any number and types of computer implemented services (e.g., to user of the system and/or devices operably connected to the system). The computer implemented services may include any type and/or quantity of computer-implemented services. The computer implemented services may be provided by data processing systems to consumers of the computer implemented services based on an operation of the distributed system of which the data processing systems may be a part.

To provide the computer-implemented services, as desired by the consumer of the services, operation of the data processing systems (e.g., operation of the distributed system) may be managed. The operation may be managed using artificial intelligence. For example, (trained) inference models may be used to assess, predict, and/or otherwise manage occurrences of events that may negatively impact provisioning of the computer implemented services as desired by providing useful final responses. Also, to increase a likelihood of generating reliable responses during inferencing, a retrieval-augmented generation (RAG) process may be implemented to improve informational content of the ingest data to the inference models.

To do so, a first prompt, received by the distributed system, may undergo preprocessing, during which context data may be obtained for terms present in the first prompt. The context data may include (i) system logs (e.g., at least one record of an event and/or an activity within a data processing system, etc.), (ii) performance metrics (e.g., memory consumption, at least one input/output operation, network traffic, etc.), (iii) system health checks (e.g., at least one report of a status of the data processing system, etc.), (iv) any other data that indicates, for example, (a) an attribute of, (b) a capability of, (c) a measurement determined by, (d) a message by, (e) an observation recorded by, etc. a data processing system. The first prompt may include an input, such as (i) a query, (ii) a request, (iii) an instruction, (iv) a validation, and/or (v) any other type of input used to interact with the distributed system. At least one second prompt may be (i) generated, using at least the first prompt, by a first generative trained machine learning model and/or (ii) transmitted, by a management system of the distributed system, to at least one subnet of the distributed system. The first generative trained machine learning model may include (i) a first large language model (LLM), (ii) a first small language model (SLM), etc. The at least one second prompt (i) may be derived from the first prompt and/or (ii) may therefore include similar content and/or different content compared to the first prompt. The similar content and/or the different content may include (i) at least one first attribute, (ii) at least one first capability, (iii) first information, and/or (iv) any other first data of the at least one subnet of the distributed system.

The management system may initiate the RAG processing by transmitting the first prompt and/or the at least one second prompt to the at least one subnet. The at least one subnet may continue the RAG processing by generating, using at least the first prompt and/or at least the at least one second prompt, at least one third prompt by a second generative trained machine learning model. The second generative trained machine learning model may include (i) a second large language model (LLM), (ii) a second small language model (SLM), etc. The at least one third prompt (i) may include the similar content and/or the different content compared to the first prompt and/or to the at least one second prompt and/or therefore (ii) may utilize (a) at least one second attribute, (b) at least one second capability, (c) second information, and/or (d) any other second data of at least one edge device of the distributed system.

The at least one subnet may continue the RAG processing by transmitting the first prompt and/or the at least one second prompt and/or the at least one third prompt to the at least one edge device. The at least one edge device may continue the RAG processing by generating, using (i) the at least the first prompt, (ii) the at least one second prompt, (iii) the at least one third prompt, and/or (iv) local information of the at least one edge device, a first response using a third generative trained machine learning model. The third generative trained machine learning model may include (i) a third large language model (LLM), (ii) a third small language model (SLM), etc.

The least one subnet may continue the RAG processing by receiving, from the at least one edge device, each first response of the at least one edge device to obtain a plurality of first responses. However, content of at least two first responses of the plurality of the first responses may include redundant information. The redundant information may include (i) duplicative data (e.g., at least first data and/or at least second data including completely matching information), (ii) partially duplicative data (e.g., the at least first data and/or the at least second data including partially matching information that includes at least one difference), (iii) repeated data (e.g., the at least first data including at least two copies of a data entry such as (i) text, (ii) tag, (iii) label, (iv) integer, (v) key and/or value pair, and/or (vi) any other data value of any other data type. Because the content of at least two first responses of the plurality of the first responses may include the redundant information, the computer implemented services may be impacted. The computer impacted services may be impacted because (i) generation of the redundant information indicates duplicative processing by the at least one edge device, (ii) the duplicative processing can therefore indicate an unnecessary consumption of computational resources, (iii) ingestion of the redundant information by a generative trained machine learning model can affect a quality and/or reliability of an output of the generative trained machine learning model, etc.

In general, embodiments disclosed here relate to systems and methods for method for managing operation of a distributed system. The operation may be managed by (i) obtaining, by a management system of the distributed system, and using a first prompt, a plurality of second prompts for subnets of the distributed system, each of the subnets comprising a subnet manager and at least one of the edge devices, (ii) initiating, by the management system, first retrieval augmented generation (RAG) processing of the plurality of the second prompts by the subnets using locally available data hosted by a sub-portion of portions of the edge devices that are members of each of the subnets, the sub-portion being deemed likely to provide unique responses to respective subnet managers of the subnets as part of the first RAG processing, and the locally available data being used as knowledge sources for the first RAG processing to obtain a plurality of first responses from the subnets, (iii) performing, by the management system, second RAG processing of the first prompt using the plurality of the first responses as a knowledge source for the second RAG processing to obtain a final response, and (iv) and providing, by the management system, computer implemented services using the final response.

The plurality of the second prompts may be obtained by generating, by the management system, the second prompts using the prompt. The second prompts may be derived by (i) performing at least one modification, based on at least one attribute and/or at least one capability of at least one edge device of the at least one subnet, to information of the prompt and/or (ii) generating, using the at least one modification of the information, the second prompts. The at least one attribute and/or the at least one capability of the edge devices of the at least one subnet may include (i) system usage data (e.g., memory usage, network traffic, input/output operations, etc.), (ii) environmental ambient conditions (e.g., temperature data, humidity data, air pressure data, dust and/or dirt exposure data, heat generation data, heat dissipation data, etc.), (iii) threat assessments (e.g., data regarding physical tampering, the data regarding network security, data breaches, etc.), (iv) any other attributes reflective of any other conditions of the at least one edge device. The at least one capability may include (i) data collections (e.g. environmental sensing, location tracking, etc.), (ii) data transmission (e.g., multi-channel communications, mesh networking, etc.), (iii) sensing capabilities (e.g., motion sensing, optical sensing, acoustic sensing, etc.), (iv) any other capability used in operation of the at least one edge device.

The first RAG processing of the plurality of the second prompts may be initiated by (i) transmitting the second prompts to the at least one subnet, (ii) transmitting, by a subnet manager of the at least one subnet, a second prompt of the second prompts to the sub-portion of a portion of at least one edge device of the at least one subnet, (iii) performing, by the sub-portion of the portion of the at least one edge device, the first RAG processing to generate at least one first response, and/or (iv) obtaining, by the subnet manager, the at least one first response of the at least one edge device to generate the plurality of the first responses. The subnet manager may manage the operation of the at least one edge device. The subnet manager may (i) distribute the second prompts to the sub-portion of the portion of the at least one edge device, (ii) modify a second prompt of the second prompts before the distribution of the second prompt based on, for example, the at least one attribute and/or at least one capability of the at least one edge device, (iii) retrieve the at least one first response by the sub-portion of the portion of the at least one edge device to the second prompt to generate the plurality of the first responses, (iv) rank order the plurality of the first responses of the at least one first response based on any magnitude of first relevance to at least the second prompt and/or the prompt, (v) transmit at least a portion of the plurality of the first responses to the management system, etc. A first subnet manager may utilize a first ranking criteria of the plurality of the first responses that is different and/or similar than a second ranking criteria of a second subnet manager.

The sub-portion of the portion of the at least one edge device may be selected by the subnet manager of the at least one subnet before the first RAG processing. Selection of the sub-portion of the portion of the at least one edge device may be initiated by (i) selecting at least one first historical prompt, (ii) distributing at least one first historical prompt to the portion of the at least one edge device, and/or (iii) retrieving at least one first historical response by the portion of the at least one edge device to the at least one first historical prompt to generate the plurality of the second historical responses. The at least one first historical response may be, at an earlier time, generated, using at least a previous prompt that was received from the management system and/or stored on the at least one subnet. The at least one first historical response may be stored by the subnet manager in a data matrix that includes (i) a tensor, (ii) an array, (iii) a tree, (iv) any other data structure that permits organization of data based on at least one dimension. The at least one dimension may include (i) a data chunk of the at least one first historical response, (ii) the at least one edge device that (a) stored that at least one first historical response and/or (b) transmitted the at least one first historical response to the at least one subnet, (iii) a timestamp (e.g., at least a time and/or at least a date) of the at least one first historical response, etc.

Selection of the sub-portion of the portion of the at least one edge device may be continued by performing an information elimination on the data matrix that includes the at least one first historical response. The information elimination may be performed by eliminating data chunks from the data matrix that includes redundant information (e.g. duplicative context data and/or conflicting context data). To eliminate the duplicative context data and/or the conflicting context data, at least one data chunk of the data chunks may be compared to a second at least one data chunk. If duplicative context data is found between the at least one data chunk and/or the second at least one data chunk, a portion of the data matrix that includes either the at least one data chunk and/or the second at least one data chunk may be removed to eliminate the duplicative context data.

Further, if conflicting context data is found, between the at least one data chunk and/or the second at least one data chunk, the portion of the data matrix that includes either the at least one data chunk and/or the second at least one data chunk may be removed to eliminate the conflicting context data. The conflicting context data may be removed, for example, in a data chunk of the at least one data chunk and/or the second at least one data chunk. The conflicting context data may be removed by, for example, confirming at least one definition of ontology terms (e.g., words and/or phrases defined by an administrator, trusted knowledge base, etc. of the data processing system, etc.) and/or eliminating a portion of the at least one data chunk and/or the second at least one data chunk that utilizes the ontology terms.

By removing the at least one data chunk from the data matrix, a modified data matrix may be generated. The modified data matrix may include data chunks that do not include redundant information. From the modified data matrix, a catalog of the sub-portion of the portion of the at least one edge device may be obtained. The catalog of sub-portion may be obtained by identifying the edge devices associated with the at least one data chunk of the modified data matrix. The edge device may be identified by, for example, (a) extracting an edge device identification from the data chunk itself, (b) extracting a position of the data chunk from the at least one dimension of the modified data matrix, (c) any other method that yields the edge device identification from at least the data chunk and/or at least the modified data matrix.

Although the catalog of the sub-portion of the portion of the at least one edge device has been generated that does not yield redundant information in the data chunks of the plurality of the first responses, the catalog of the sub-portion of the portion of the at least one edge device may be modified to permit a measure of redundancy in the plurality of the first responses. The measure of the redundancy may enable verification, by (i) a subnet manager, (ii) an administrator, and/or (iii) any other regulatory entity of the distributed system, of normal operation and/or generation of accurate responses by the sub-portion of the portion of the at least one edge device. The catalog of the sub-portion of the portion of the at least one edge device may be modified by adding at least a second at least one edge device that generates the at least one data chunk with redundant information. By modifying the catalog of the sub-portion of the portion of the at least one edge device, a second catalog of the sub-portion of the portion of the at least one edge device may be generated. The subnet manager may ensure that the at least a second at least one edge device of the second catalog has computing resources (e.g., central processing usage (CPU) level, memory usage, network traffic level, etc.) available to perform the first RAG processing.

The second RAG processing may be performed, by the management system, by (i) receiving, from the subnet manager of the at least one subnet, the at least the portion of the plurality of the first responses and/or (ii) generating the final response using a trained generative inference model. The generative trained inference model may include a large language model (LLM), a small language model (SLM), etc.

The final response may be used to provide computer implemented services. The final response may include, for example, (i) a notification of, for example, an anomaly, critical event, etc., (ii) a recommendation for, for example, maintenance, optimization, configuration change, etc. (iii) a result of at least one scenario based on, for example, performance data and/or user interactions, etc. The final response may be used by providing information from (i) the notification, (ii) the recommendation, (iii) the result, etc. in a plan to (i) maintain, (ii) optimize, (iii) remediate, etc. at least one data processing system that is used to provide computer implemented services.

To provide the above-mentioned functionality, the distributed system of FIGS. 1A-1B may include management system 100, edge subnets 104, edge subnet management system 106, edge devices 110, communication system 102, and/or communication system 108. The distributed system, any components thereof, and/or any other types of devices or components not shown in FIGS. 1A-1B may perform all, or a portion of the computer-implemented services independently and/or cooperatively. Each of these components is discussed below.

Management system 100 may generally manage the operation of the system of FIGS. 1A-1B. For example, management system 100 may receive requests, instructions, etc. to be performed with respect to components of the distributed system. To service the requests, instructions, etc., management system 100 may use the first generative trained machine learning model, as discussed above.

Edge devices 110 may provide any number and type of computer implemented services and/or be managed by management system 100. During such management, edge devices 110 may participate in a distributed generative inference model pipeline. For example, each of these edge devices may include access to a local database that (i) is inaccessible to management system 100, and/or (ii) may include stored data regarding its host that may be beneficial to contribute to (directly and/or indirectly) context data for servicing the first prompt received by management system 100. The local database may include information such as, for example, logs of operation of the system, issues impacting the respective edge devices, locally collected and/or generated information (e.g., sensor measurements, derived information from the sensor measurements, etc.), and/or any other type of local information obtained and/or generated by the edge device (and/or information provided to it by other devices).

Edge subnets 104 may include edge subnet 104A-104N. An edge subnet (e.g., edge subnet 104N) may include at least a portion of edge devices (e.g., edge devices 110A-110N) and/or an edge subnet management system (e.g., edge subnet management system 106). The edge subnet (e.g., 104N) may include (i) network segmentation (e.g., a defined range of internet protocol addresses), (ii) resource allocation (e.g., load balancing of workloads), (iii) redundancy measures (e.g., backup devices to maintain data integrity and/or data availability), (iv) operational diversity (e.g., inclusion and/or utilization of various sensors (e.g., temperature, motion, imaging, etc.)), etc.

The edge subnet management system (e.g., edge subnet management system 106) may be used to manage operation of the at least the portion of edge devices (e.g., edge devices 110A-110N) of the edge subnet (e.g., edge subnet 104N). The edge subnet management system may manage the at least the portion of edge devices by (i) distributing prompts to the at least one edge device, (ii) modifying a prompt of the prompts before the distribution of the prompt based on, for example, at least one attribute and/or at least one capability of at least one edge device of the at least the portion of the edge devices, (iii) retrieving a first response by the at least one edge device to the prompt to generate a plurality of the first responses, (iv) rank ordering the plurality of the first responses based on any magnitude of first relevance to at least the prompt, (v) transmitting at least a portion of the plurality of the first responses to the management system (e.g., 100), (vi) any other action that engages operation of the at least the portion of edge devices and/or utilizes data provided by the at least the portion of edge devices.

While providing their functionality, any of management system 100, edge subnets 104, edge subnet management system 106, and/or edge devices 110 may perform all, or a portion, of the flows and methods shown in FIGS. 2A-2D.

Any of (and/or components thereof) management system 100, edge subnets 104, edge subnet management system 106, and/or edge devices 110 may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 4.

Any of the components illustrated in FIGS. 1A-1B may be operably connected to each other (and/or components not illustrated) with communication system 102 and/or communication system 108. In an embodiment, communication system 102 and/or communication system 108 include one or more networks that facilitate communication between any number of components. The networks may include wired networks and/or wireless networks (e.g., and/or the Internet). The networks may operate in accordance with any number and types of communication protocols (e.g., such as the Internet protocol).

To further clarify embodiments disclosed herein, interactions diagrams in accordance with an embodiment are shown in FIGS. 2A-2D. These interactions diagrams may illustrate how data may be obtained and used within the system of FIG. 2A-2D.

In the interaction diagrams, processes performed by and interactions between components of a system in accordance with an embodiment are shown. In the diagrams, components of the system are illustrated using a first set of shapes (e.g., 100, 106, etc.), located towards the top of each figure. Lines descend from these shapes. Processes performed by the components of the system are illustrated using a second set of shapes (e.g., 200, 202, etc.) superimposed over these lines. Interactions (e.g., communication, data transmissions, etc.) between the components of the system are illustrated using a third set of shapes (e.g., 204, 208, etc.) that extend between the lines. The third set of shapes may include lines terminating in one or two arrows. Lines terminating in a single arrow may indicate that one way interactions (e.g., data transmission from a first component to a second component) occur, while lines terminating in two arrows may indicate that multi-way interactions (e.g., data transmission between two components) occur.

Generally, the processes and interactions are temporally ordered in an example order, with time increasing from the top to the bottom of each page. For example, the interaction labeled as 204 may occur prior to the interaction labeled as 208. However, it will be appreciated that the processes and interactions may be performed in different orders, any may be omitted, and other processes or interactions may be performed without departing from embodiments disclosed herein.

Figure 2A:
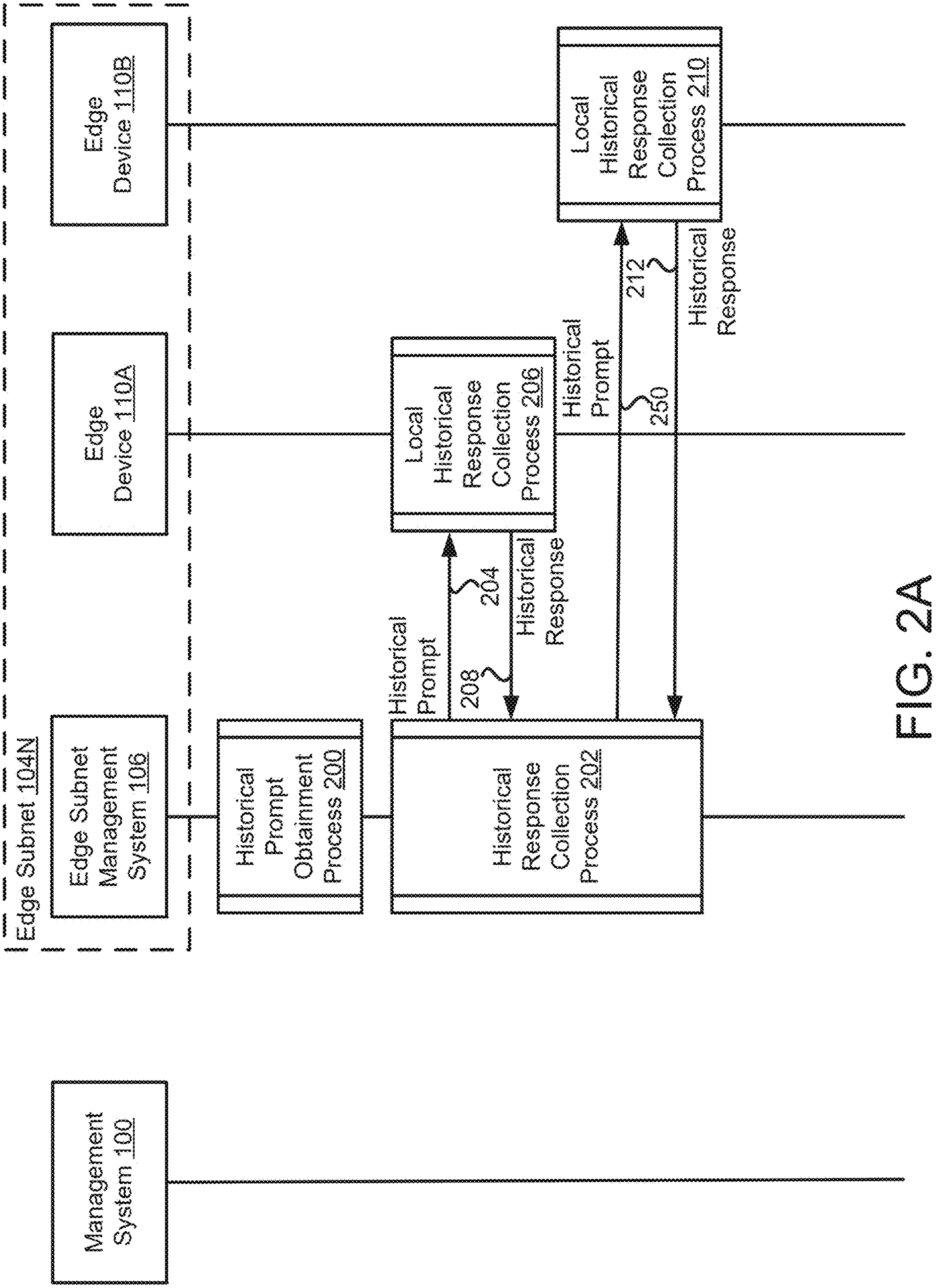
FIGS. 2A-2D show interaction diagrams illustrating operation of the distributed system in accordance with an embodiment.

Turning to FIG. 2A, a first interaction diagram in accordance with an embodiment is shown. The first interaction diagram may illustrate data used in and data processing performed in obtaining at least one historical response from at least one edge device.

To obtain at least one historical response from the at least one edge device, historical prompt obtainment process 200 may be performed. During historical prompt obtainment process 200, the historical prompt may be obtained by a subnet manager of at least one subnet (e.g., 106). The historical prompt may be obtained by performing a first search for the historical prompt from a subnet repository of the subnet. The subnet manager may perform the first search using, for example (i) first tags and/or first metadata (e.g., date created, data modified, data chunk type, data chunk size, checksum, access permissions, etc.), (ii) first data chunk attributes (e.g., content, location creation, index, etc.), (iii) first search criteria (e.g., exact match of data chunk content, partial match of data chunk content, Boolean search, etc.), (iv) any other first search criteria that enables obtainment of the historical prompt from the subnet repository. The (i) first tags and/or first metadata, (ii) first data chunk attributes, (iii) the first search criteria, (iv) any other first search criteria may be based on content provided to the subnet manager by (i) a user, (ii) an administrator, (iii) software, (iv) any other entity that provides the content to the at least one subnet (e.g., 104N). Once the historical prompt has been obtained, historical response collection process 202 may be performed.

During historical response collection process 202, the historical prompt may be (i) assigned for transmission and/or (ii) transmitted to at least one edge device and/or any other edge device (e.g., 110A, 110B, etc.) of the at least one subnet (e.g., 104N). The historical prompt may be transmitted by sending the historical prompt using communication system 108 of the distributed system. The historical prompt may be sent using, for example, (i) shared memory, (ii) a data stream, (iii) a message queue, etc.

At least one edge device (e.g., 110A, 110B, etc.) may receive the historical prompt (e.g., 204, 250, etc.) from the at least one subnet (e.g., 104N). The at least one edge device (e.g., 110A, 110B, etc.) may then perform a local historical response collection process (e.g., 206, 210).

During the local historical response collection process (e.g., 206, 210), a historical response (e.g., 208, 212, etc.) to the historical prompt (e.g., 204, 250, etc.) may be obtained by the at least one edge device (e.g., 110A, 110B, etc.). The historical response (e.g., 208, 212, etc.) may be obtained by performing, by the at least one edge device (e.g., 110A, 110B, etc.), a second search for the at least one historical response (e.g., 208, 212, etc.) in an edge device repository of the at least one edge device (e.g., 110A, 110B, etc.). The second may be performed using, for example (i) second tags and/or second metadata (e.g., date created, data modified, data chunk type, data chunk size, checksum, access permissions, etc.), (ii) second data chunk attributes (e.g., content, location creation, index, etc.), (iii) second search criteria (e.g., exact match of data chunk content, partial match of data chunk content, Boolean search, etc.), (iv) any other second search criteria that enables obtainment of the historical prompt from the subnet repository. The (i) second tags and/or second metadata, (ii) second data chunk attributes, (iii) the second search criteria, (iv) any other second search criteria may be based on the content of the historical prompt (e.g., 204, 250, etc.). A first historical response of the at least one historical response (e.g., 208, 212, etc.) may include a third data chunk that is similar and/or different then a fourth data chunk of a second historical prompt of the at least one historical response (e.g., 208, 212, etc.).

The historical response (e.g., 208, 212, etc.) may be transmitted to the at least one subnet (e.g., 104N) by the at least one edge device (e.g., 110A, 110B, etc.). The historical response (e.g., 208, 212, etc.) may be transmitted by sending the historical response using the communication system (e.g., 108) of the distributed system. The historical response (e.g., 208, 212, etc.) may be sent using, for example, (i) the shared memory, (ii) the data stream, (iii) the message queue, etc.

The at least one subnet (e.g., 104N) may receive the historical response (e.g., 208, 212, etc.) and/or performance of historical response collection process 202 may be continued. During historical response collection process 202, a plurality of historical responses may be obtained by collecting each of historical responses (e.g., 208, 212, etc.) from the transmission by the at least one edge device (e.g., 110A, 110B). The plurality of the historical responses (e.g., 208, 212, etc.) may include the least one data chunk of each of the historical response (e.g., 208, 212).

Thus, via the first interaction illustrated in FIG. 2A, a system in accordance with an embodiment may obtaining at least one historical response (e.g., 208, 212, etc.) from at least one edge device (e.g., 110A, 110B, etc.). Consequently, the distributed system may be more likely to be able to provide desired computer implemented services by collecting at least one historical response (e.g., 208, 212, etc.) to the historical prompt (e.g., 204, 250, etc.) that is used to extract specific, relevant, actionable, etc. information from a local repository of an edge device.

Figure 2B:
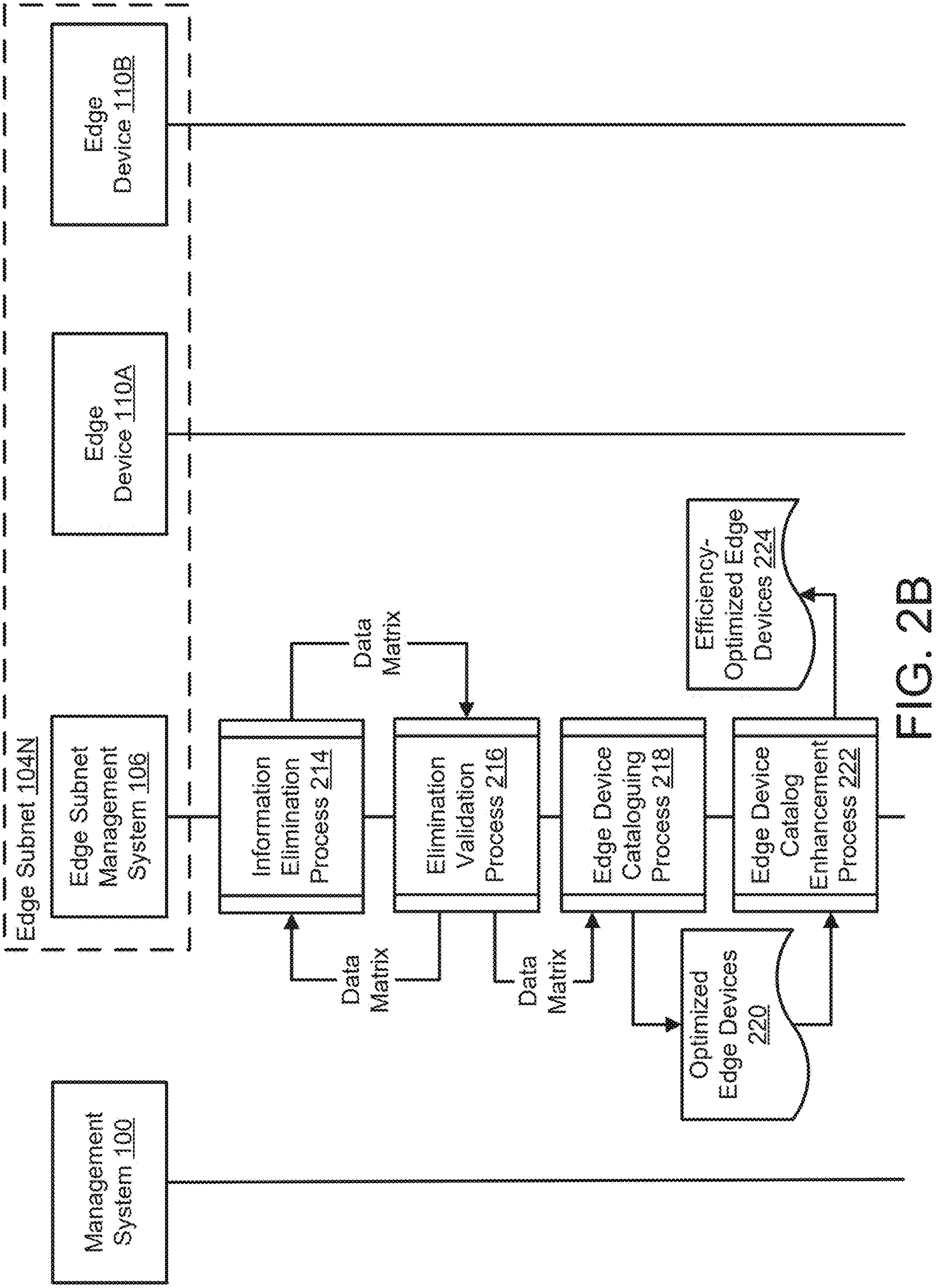

Turning to FIG. 2B, a second interaction diagram in accordance with an embodiment is shown. The second interaction diagram may illustrate data used in and data processing performed in generating a catalog of a sub-portion of a portion of the at least one edge device (e.g., 110A, 110B, etc.).

The portion of the at least one edge device (e.g., 110A, 110B, etc.) may include all edge devices that are included in the at least one subnet (e.g., 104N) and/or managed by the subnet manager of the at least one subnet (e.g., 104N). To generate the catalog, information elimination process 214 may be performed.

During information elimination process 214, the at least one first historical response (e.g., 208, 212, etc.) may be stored by the subnet manager in a subnet repository of the at least one subnet (e.g., 104N). The at least one first historical response (e.g., 208, 212, etc.) may be added by the subnet manager to a data matrix that includes (i) a tensor, (ii) an array, (iii) a tree, (iv) any other data matrix that permits organization of data based on at least one dimension. The at least one dimension may include (i) a data chunk of the at least one first historical response, (ii) the at least one edge device that (a) stored that at least one first historical response and/or (b) transmitted the at least one first historical response to the at least one subnet, (iii) a timestamp (e.g., an indication of at least a time and/or at least a date) of the at least one first historical response, etc.

During information elimination process 214, data chunks of the at least one first historical response (e.g., 208, 212, etc.) of the data matrix may be eliminated from the data matrix. The data chunks that are be eliminated may include redundant information (e.g. duplicative context data and/or conflicting context data). To eliminate the duplicative context data and/or the conflicting context data, at least one data chunk of the data chunks may be compared to a second at least one data chunk in the data matrix. If the duplicative context data and/or the conflicting context data is found between the at least one data chunk and/or the second at least one data chunk, the at least one data chunk and/or the second at least one data chunk may be eliminated from the data matrix.

Methods by which the duplicative context data and/or the conflicting context data can be found may include (i) keyword searching (e.g., searching for at least key and/or value pairs with non-matching values), (ii) exact match searching (e.g., searching for at least one portion of warnings, status messages, etc. to perform at least one comparisons), (iii) data normalization (e.g., converting data into at least one standard format to enable performance of the at least one comparison), (iv) data validation (e.g., ensuring that the data conforms to at least one pre-defined schema, with which to identify invalid and/or inconsistent entries), (v) information deduplication (e.g., generating, using a large language model, first text using information from a second text), etc.

If the duplicative context data has been found between the at least one data chunk and/or the second at least one data chunk, the at least one data chunk and/or the second at least one data chunk may be eliminated from the data matrix, using, for example, a trained generative machine learning model (e.g., a large language model (LLM), a small language model (SLM), etc.) from either the at least one data chunk or the second at least one data chunk. The trained generative machine learning model may, for example, (i) ingest (a) at least the at least one data chunk, (b) at least the second at least one data chunk, and/or (c) any other at least one data chunk, and/or (ii) generate a ranking that includes (a) at least the at least one data chunk, (b) at least the second at least one data chunk, and/or (c) any other at least one data chunk. The ranking may be used to prioritize removal of either the at least one data chunk and/or or the second at least one data chunk, whichever has a lower ranking of the ranking, from the data matrix.

If the conflicting context data has been found between the at least one data chunk and/or the second at least one data chunk, the at least one data chunk and/or the second at least one data chunk may be eliminated from the data matrix, using, for example, the trained generative machine learning model, from either the at least one data chunk and/or the second at least one data chunk. The conflicting context data may be found by, for example, (i) a first comparison between at least two key and/or value pairs, (ii) a second comparison between at least two warnings, status messages, etc., (iii) a third comparison between normalized data, etc., between the at least one data chunk and/or the second at least one data chunk. Once the conflicting context data has been found, a determination may be made which of the key and/or value pairs, warnings, status messages, normalized data, etc. includes incorrect data of the conflicting context data. The determination may be made (i) generating, using at least the conflicting context data, a first inference from the trained generative machine learning model (e.g., large language models, small language models, etc.), (ii) comparing the conflicting context data to at least one definition of ontology terms (e.g., words and/or phrases defined by an administrator, trusted knowledge base, etc. of the data processing system, etc.), etc. Once the determination has been made, the at least one data chunk and/or the second at least one data chunk may be eliminated from the data matrix.

As a result of the removal of the at least one data chunk and/or the second at least one data chunk from the data matrix, a modified data matrix may be generated. The modified data matrix may include the at least one data chunk that does not include the redundant information. The modified data matrix may be then ingested in elimination validation process 216. During elimination validation process 216, the modified data matrix may be validated. The validation may be performed by ensuring that at least one criterium has been met. The at least one criterium may include (i) a minimum number of iterations during information elimination process 214 has been performed, (ii) a threshold score has been met and/or exceeded by (a) the keyword matching, (b) the term frequency methods, (c) the natural language processing, etc. that is set by (a) an administrator, (b) an operator, etc. of the distributed system, (c) software, (d) and/or any other regulatory entity of the distributed system.

If the at least one criterium has not been met, then the modified data matrix may be ingested by information elimination process 214 to generate a second modified data matrix by, for example, removing second redundant information (e.g. second duplicative context data and/or second conflicting context data) until the at least one criterium has been met. Otherwise, if the at least one criterium has been met, the modified data matrix may be ingested by edge device cataloging process 218.

During edge device cataloging process 218, the sub-portion of the portion of the at least one edge device (e.g., 110A, 110B, etc.) may be obtained and/or added to the catalog. The sub-portion may be obtained by identifying the at least one edge device (e.g., 110A, 110B, etc.) using the at least one data chunk of the modified data matrix. The at least one edge device (e.g., 110A, 110B, etc.) may be identified by, for example, (a) extracting an edge device identification from the at least one data chunk, (b) extracting a position of the at least one data chunk from the at least one dimension of the modified data matrix, (c) any other method that yields the edge device identification from at least the data chunk and/or at least the modified data matrix. The edge device identification of the at least one edge device (e.g., 110A, 110B, etc.) from the modified data matrix may be recorded in optimized edge devices 220.

Optimized edge devices 220 may include the catalog of the sub-portion of the portion of the at least one edge device (e.g., 110A and/or 110B, etc.). The catalog may include the sub-portion of the portion of the at least one edge device (e.g., 110A and/or 110B, etc.) that generates at least one first historical response (e.g., 208 and/or 212, etc.), each of which does not include the redundant information. However, the catalog of optimized edge devices 220 may be modified to generate a second catalog. The second catalog may include a second sub-portion of the portion of the at least one edge device (e.g., 110A, 110B, etc.) that generates at least one first historical response (e.g., 208 and/or 212, etc.), each of which includes non-redundant information and/or minimally redundant information.

The measure of the redundancy of the minimally redundant information obtained by the second sub-portion may enable verification, by (i) a subnet manager, (ii) an administrator, and/or (iii) any other regulatory entity of the distributed system, of normal operation and/or generation of accurate responses by at least edge devices in optimized edge devices 220.

To generate the second catalog, optimized edge devices 220 may be modified to generate efficiency-optimized edge devices 224 (which includes the second catalog) during edge device catalog enhancement process 222. During edge device catalog enhancement process 222, the at least one edge device (e.g., 110A, 110B, etc.) may be added to optimized edge devices 220. The at least one edge device (e.g., 110A, 110B, etc.) may be added by selecting the at least one edge device (e.g., 110A, 110B, etc.) that generated the at least one data chunk with the minimally redundant information. The selection may include making at least one comparison, by the subnet manager, between a third at least one data chunk in the data matrix and/or a fourth at least one data chunk in the modified data matrix. The subnet manager may ensure that (i) the third at least one data chunk and/or the fourth at least one data chunk includes the minimally redundant information and/or (ii) a first edge device that generates the at least third data chunk and/or a second edge device that generates the at least fourth data chunk include computing resources (e.g., central processing usage (CPU) level, memory usage, network traffic level, etc.) available to perform retrieval augmented generation processing. If (i) the third at least one data chunk and/or the fourth at least one data chunk includes minimally redundant information, and/or (ii) the first edge device that generates the at least third data chunk and/or the second edge device that generates the at least fourth data chunk include the computing resources, then the first edge device and/or the second edge device may be added to the catalog of optimized edge devices 220 to generate the second catalog of efficiency-optimized edge devices 224.

Thus, via the second interaction illustrated in FIG. 2B, a system in accordance with an embodiment may generating the catalog of the sub-portion of the portion of the at least one edge device (e.g., 110A, 110B, etc.). Consequently, the distributed system may be more likely to be able to provide desired computer implemented services by making a determination about which edge devices generate responses that include non-redundant information and/or minimally redundant information to a prompt.

Figure 2C:
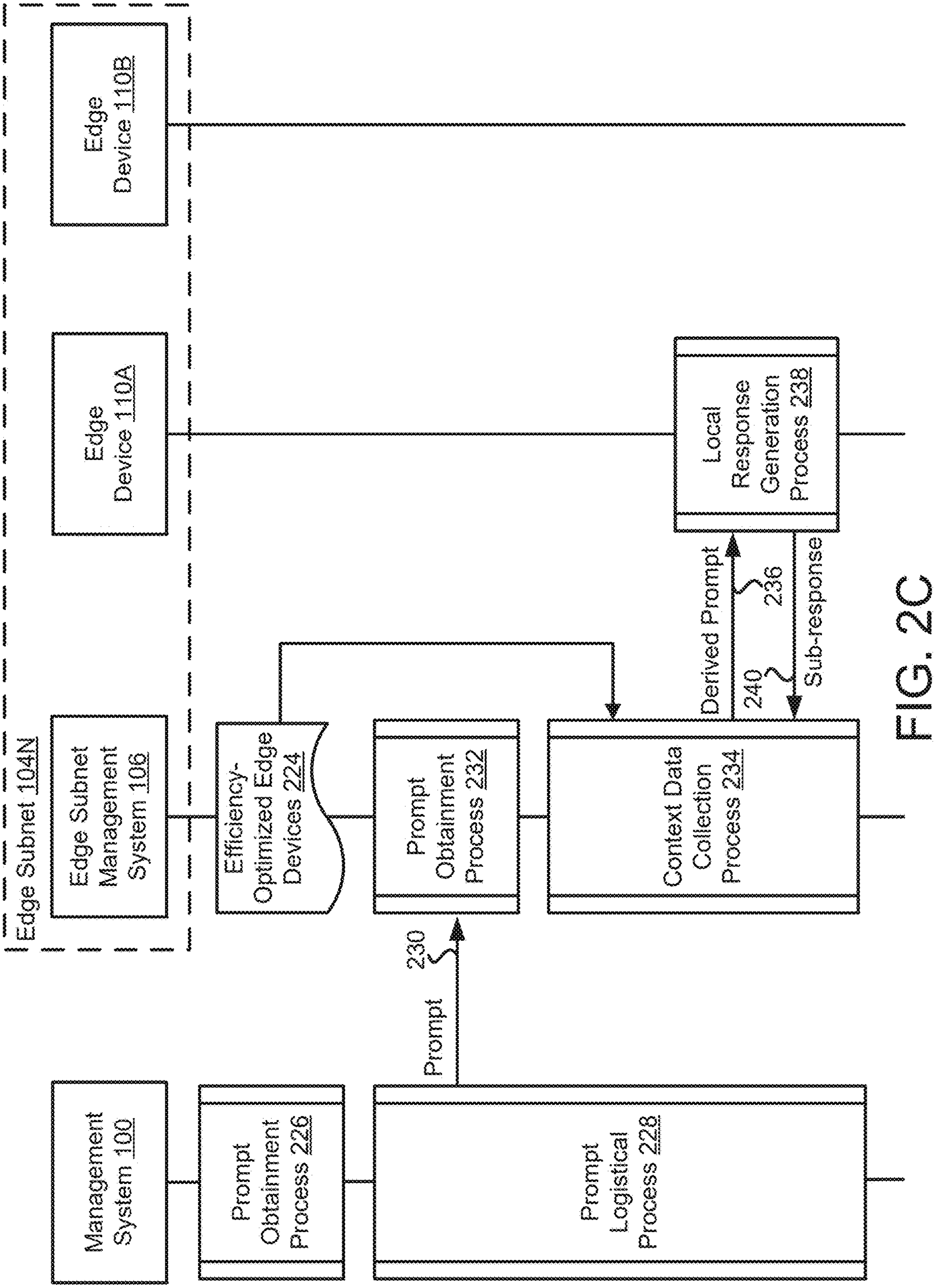

Turning to FIG. 2C, a third interaction diagram in accordance with an embodiment is shown. The third interaction diagram may illustrate data used in and data processing performed in receiving a first response (e.g., 240) from at least one edge device (e.g., 110A, not 110B, etc.).

To receive the first response (e.g., 240), prompt obtainment process 226 may be performed. During prompt obtainment process 226, (i) a first prompt may be submitted for processing by a first generative trained machine learning model, (ii) a determination may be made regarding whether there is access to information that may be relevant to the first prompt, or whether there is a lack of sufficient information regarding edge devices of the distributed system to service the first prompt (e.g., serviced by a management system (e.g., 100)).

Assume that (i) the first generative trained machine learning model is hosted by the management system (e.g., 100) and (ii) the first prompt may be obtained as an outcome of any number of processes/operations. For example, the first prompt may be (i) provided by a user based on the user's interaction with the distributed system via a user interface (UI), (ii) generated by software hosted by management system 100 as a result of an operation by the management system (e.g., 100), and/or (iii) any other type and/or quantity of processes/operations not to be limited by embodiments discussed herein.

For example, the first prompt may include (e.g., assuming that the first prompt is based on the previously mentioned user interaction via a UI) a string of text such as "perform an analysis of effects of heat dissipation on an operation of an edge device . . . " To perform the analysis requested by the first prompt, (i) temperature data, (ii) power consumption data, (iii) cooling system performance data, (iv) any other data, etc. may be needed to meet a request of the first prompt. As the distributed system may include at least one subnet and/or at least one edge device of the at least one subnet, the management system (e.g., 100) may determine (i) to which of the at least one subnet to transmit the first prompt and/or (ii) what modification/s, addition/s, etc., if necessary, to perform on a content of the first prompt to generate at least one second prompt.

The management system (e.g., 100) may determine to which of the at least one subnet to transmit the first prompt and/or the second prompt by (i) ingesting, by the first generative trained machine learning model, (a) at least one location, (b) at least one power consumption metric, (c) at least one environmental condition, (d) any other second data, etc. of the at least one subnet and/or the at least one edge device of the at least one subnet and/or (ii) determining, for example, which of the at least one subnet and/or the at least one edge device may be affected by (a) the at least one location, (b) the at least one power consumption metric, (c) the at least one environmental condition, (d) the any other second data etc. Further, management system 100 may determine what modification/s, addition/s, etc., if necessary, to perform on the first prompt to generate the at least one second prompt by (i) ingesting, by the first generative trained machine learning model, at least the first prompt and/or, if necessary, first information of the at least one subnet and/or second information of the at least one edge device first that may be affected and/or (ii) generating the second prompt. The second prompt may include, for example, at least one detail of the analysis in the second prompt regarding (i) thermal throttling, (ii) hardware damage, (iii) energy efficiency, (iv) noise level, (v) any other behavior, performance, attribute, capability, etc. of the at least one subnet and/or the at least one edge device.

After prompt obtainment 226 has been performed, prompt logistical process 228 may be performed. During prompt logistical process 228, distribution of at least the first prompt and/or the second prompt to the at least one subnet may be performed. For example, the first prompt and/or the second prompt (e.g., 230, which may include the at least one modification, the at least one addition, etc. to the content (e.g., data chunks, etc.) of the first prompt may be transmitted to the at least one subnet (e.g., 104N). The first prompt and/or the second prompt (e.g., 230) may be transmitted by sending the first prompt and/or the second prompt (e.g., 230) using a communication system (e.g., 102) of the distributed system. The first prompt and/or the second prompt (e.g., 230) may be sent using, for example, (i) shared memory, (ii) a data stream, (iii) a message queue, etc.

After the first prompt and/or the second prompt (e.g., 230) has been transmitted, the at least one subnet (e.g., 104N) may receive the first prompt and/or the second prompt (e.g., 230). After the first prompt and/or the second prompt (e.g., 230) has been received, prompt obtainment process 232 may be performed. Prompt obtainment process 232 may be performed by the at least one subnet (e.g., 104N).

To perform prompt obtainment process 232, the at least one subnet (e.g., 104N) may perform (i) a second at least one modification, (ii) a second at least one addition, etc. to the first prompt and/or the second prompt (e.g., 230) to generate a third prompt. The third prompt may be generated by (i) ingesting, by a second generative trained machine learning model, (a) at least the first prompt, (b) at least the second prompt (e.g., 230), and/or (c) at least one attribute, capability, detail, etc. of the at least one edge device, etc. and/or (ii) performing (a) the second at least one modification, (b) the second at least one addition, etc. to the content (e.g., data chunks) of the first prompt and/or second content (e.g., second data chunks) of the second prompt (e.g., 230) to generate the third prompt. The third prompt, for example, may include the string of a second text such as "diagnose at least one possible cause of frequent rebooting by the edge device . . . " The third prompt may be generated because, for example, the at least one edge device may be continuously rebooting due for an undetermined reason.

After prompt obtainment process 232 has been performed, context data collection process 234 may be performed by the at least one subnet (e.g., 104N). During context data collection process 234, (i) the first prompt, (ii) the second prompt (e.g., 230), (iii) the third prompt, and/or (iv) any other prompt (e.g., 240, etc.) obtained and/or generated during prompt obtainment process 226 and/or prompt obtainment process 232 may be (i) assigned for transmission and/or (ii) transmitted to the at least one edge device (e.g., 110A, not 110B, etc.) catalogued in efficiency-optimized edge devices 224 of the at least one subnet (e.g., 104N).

The at least one edge device (e.g., 110A, not 110B, etc.) catalogued in efficiency-optimized edge devices 224 may have been determined, using processes described in the descriptions of FIGS. 2A-2B, to generate at least one first response with non-redundant information and/or minimally redundant information. By using the at least one edge device (e.g., 110A, not 110B, etc.) to generate the at least one first response, (i) duplicative processing by the edge devices may be mitigated and/or eliminated, (ii) unnecessary consumption of computational resources due to the duplicative processing may be prevented, and/or (iii) a quality and/or reliability of an output, generated by a generative trained machine learning model that ingests the at least one first response, may be improved.

Further, a first content of a first any other prompt (e.g., 230) and/or a second content of a second any other prompt (e.g., 236) (i) may be duplicative, (ii) may include small magnitude of differences, (iii) may include a large magnitude of differences, and/or (iv) may not include any matching content. The first prompt, the second prompt (e.g., 230), the third prompt, and/or the any other prompt (e.g., 236, etc.) may be transmitted by sending (i) the first prompt, (ii) the second prompt (e.g., 230), (iii) the third prompt, and/or (iv) the any other prompt (e.g., 236, etc.) using the communication system (e.g., 108) of the distributed system. The first prompt, the second prompt (e.g., 230), the third prompt, and/or the any other prompt (e.g., 236, etc.) may be sent using, for example, (i) the shared memory, (ii) the data stream, (iii) the message queue, etc.

An edge device (e.g., 110A, not 110B, etc.) may receive (i) the first prompt, (ii) the second prompt (e.g., 230), (iii) the third prompt, and/or (iv) the any other prompt (e.g., 236, etc.) from the at least one subnet (e.g., 104N). The edge device (e.g., 110A, not 110B, etc.) may then perform a local response generation process (e.g., 238).

During the local response generation process (e.g., 238), (i) (a) the first prompt, (b) the second prompt (e.g., 230), (c) the third prompt, and/or (d) the any other prompt (e.g., 236, etc.) may be obtained by the at least one subnet (e.g., 104N), (ii) (a) the first prompt, (b) the second prompt (e.g., 230), (c) the third prompt, and/or (d) the any other prompt (e.g., 236, etc.) may be used as input for a third generative trained machine learning model locally hosted by the at least one edge device (e.g., 110A, not 110B, etc.) while local storage (e.g., a local database) of the at least one edge device (e.g., 110A not 110B, etc.) may be accessed to retrieve relevant information that may also be used as input for the third generative trained machine learning model along with (a) the first prompt, (b) the second prompt (e.g., 230), (c) the third prompt, and/or (d) the any other prompt (e.g., 236, etc.), (iii) the at least one first response (e.g., 240, etc.) may be obtained as output from the third generative trained machine learning model based on the input, and/or (iv) the at least one first response (e.g., 240, etc.) may be transmitted (e.g., 236) to the at least one subnet (e.g., 104N).

The at least one first response (e.g., 240, etc.) from the at least one edge device (e.g., 110A, etc.) may include at least one data chunk concerning (a) the first prompt, (b) the second prompt (e.g., 230), (c) the third prompt, and/or (d) the any other prompt (e.g., 236, etc.) that was transmitted to the at least one edge device (e.g., 110A, not 110B, etc.). For example, as the third prompt includes the string of the second text (e.g., "diagnose at least one possible cause of frequent rebooting by the edge device . . . "), the at least one first response (e.g., 240, etc.) may include (a) temperature data of the at least one edge device recorded for a number of days, (ii) at least one warning, alert, notification, etc. concerning an operation of at least one component of the at least one edge device, (iii) system health check data for the at least one component over the number of the days, etc. Further, a third content of the first response (e.g., 240, in this case) and/or a fourth content of a second first response (e.g., not 240, in this case) (i) may include completely matching data, (ii) may include the small magnitude (i.e., minimally redundant) of differences, (ii) may include the large magnitude of differences, and/or (iii) may not include any matching content. The at least one first response (e.g., 240, etc.) may be transmitted by sending the at least one first response (e.g., 240, etc.) using the communication system (e.g., 108) of the distributed system. The at least one first response (e.g., 240, etc.) may be sent using, for example, (i) the shared memory, (ii) the data stream, (iii) the message queue, etc.

The at least one subnet (e.g., 104N) may receive the at least one first response (e.g., 240, etc.) and/or performance of context data collection process 234 may be continued. During context data collection process 234, a plurality of first responses may be obtained by collecting each of the at least one first responses (e.g., 240, etc.) from the transmission by the at least one edge device (e.g., 110A, not 110B, etc.). The plurality of the first responses may include the at least one data chunk of each of the at least one first response (e.g., 240, etc.).

Thus, via the third interaction illustrated in FIG. 2C, a system in accordance with an embodiment may receive the at least one first response (e.g., 240, etc.) from the at least one edge device (e.g., 110A, not 110B, etc.). Consequently, the distributed system may be more likely to be able to provide desired computer implemented services by generating at least one response to at least one prompt that is used to extract specific, relevant, actionable, etc. information from local information of an edge device.

Figure 2D:
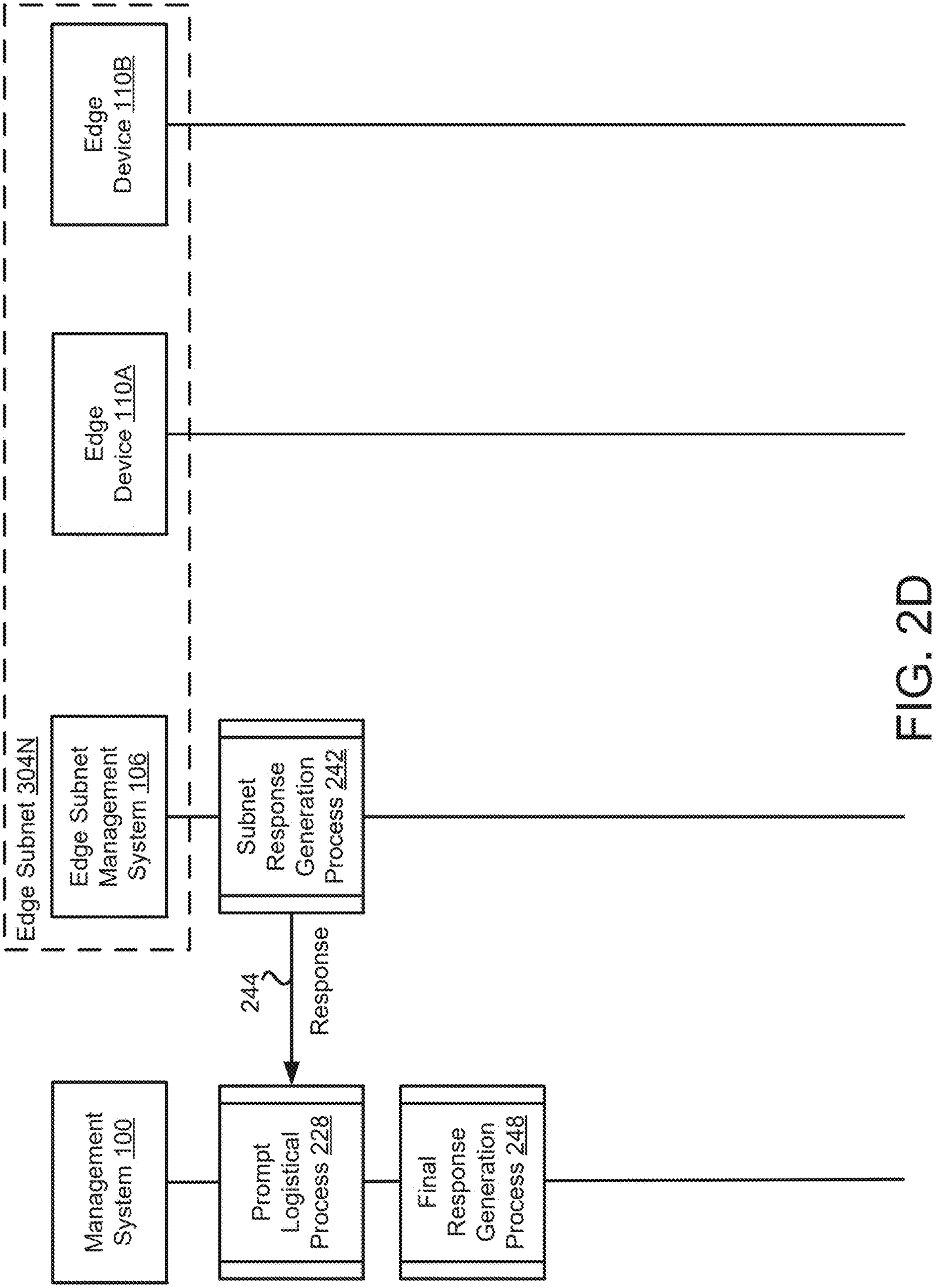

Turning to FIG. 2D, a fourth interaction diagram in accordance with an embodiment is shown. The fourth interaction diagram may illustrate data used in and data processing performed in generating a final response to the first prompt.

To generate the final response, subnet response generation process 242 may be performed. During subnet response generation process 242, the plurality of the first responses (from the description of FIG. 2C) may be ranked according to any magnitude of relevance to the first prompt. The plurality of the first responses may be ranked by (i) ingesting, by the second generative trained machine learning model, the plurality of the first responses, the first prompt, the second prompt (e.g., 230), the third prompt, the any other prompt (e.g., 236, etc.), a first ranking criteria, etc., and/or (ii) generating a first ranking of the plurality of the first responses.

The first ranking criteria may include (i) a frequency of keywords found both in the plurality of the first responses and/or in the first prompt, the second prompt (e.g., 230), the third prompt, and/or the any other prompt (e.g., 236, etc.), (ii) a measure of completeness, clarity, accuracy, contextual relevance, etc. of data in a response of the plurality of the first responses, (iii) any other criteria used to indicate a magnitude of relevance by the plurality of the first responses to the first prompt, the second prompt (e.g., 230), the third prompt, and/or the any other prompt (e.g., 236, etc.).

At least one high-ranking first response (e.g., 244) of the plurality of the first responses may be transmitted to the management system (e.g., 100). The at least one high-ranking first response (e.g., 244) may be transmitted by sending the at least one first response (e.g., 240, etc.) using a communication system (e.g., 102) of the distributed system. The at least one high-ranking first response (e.g., 244) may be sent using, for example, (i) shared memory, (ii) a data stream, (iii) a message queue, etc.

Prompt logistical process 228 (from the description of FIG. 2C) may be continued to be performed. During prompt logistical process 228, the at least one high-ranking first response (e.g., 244) of at least one subnet (e.g., 104N) may be received by the management system (e.g., 100). The at least one high-ranking first response (e.g., 244) of at least one subnet (e.g., 104N) may be collected to obtain the plurality of high-ranking first responses.

After the plurality of the high-ranking first responses has been obtained, final response generation process 248 may be performed by the management system (e.g., 100). During final response generation process 248, a final response to the first prompt may be generated. To generate the final response, the first generative trained machine learning model (from the description of FIG. 2C) may be used. The final response may be generated by (i) ingesting, by the first generative trained machine learning model, the plurality of the high-ranking first responses, the first prompt, a second ranking criteria, etc., (ii) generating a second ranking of the plurality of the high-ranking first responses, (iii) using the second ranking to re-rank the plurality of the high-ranking first responses into the plurality of the final responses, and/or (iv) selecting, by the management system (e.g., 100) at least one high-ranking final response of the plurality of the final responses as the final response.

The second ranking criteria may include (i) a frequency of second keywords found both in the plurality of the final responses and/or in the first prompt, (ii) a measure of completeness, clarity, accuracy, contextual relevance, etc. of data in a response of the plurality of the final responses, (iii) any other criteria used to indicate a magnitude of relevance by the plurality of the final responses to the first prompt.

The final response may include a string of third text. The third text may provide a notification, a recommendation, an alert, etc. to serve as a respond to the first prompt. For example, the third text may, due to effects of heat dissipation (from the first prompt in the description of FIG. 2C), (i) recommend that at least one component of the at least one edge device be repaired and/or replaced, (ii) notify that a second at least one edge device has been shut down, and/or (iii) provide any information in the final response of the first prompt using local information from the at least one edge device.

Thus, via the fourth interaction illustrated in FIG. 2D, a system in accordance with an embodiment may generate the final response to the first prompt. Consequently, the distributed system may be more likely to be able to provide desired computer implemented services by use high-ranking first responses of at least one subnet (e.g., 104N) to generate the final response to the first prompt.

Any of the processes illustrated using the second set of shapes and interactions illustrated using the third set of shapes may be performed, in part or whole, by digital processors (e.g., central processors, processor cores, etc.) that execute corresponding instructions (e.g., computer code/software). Execution of the instructions may cause the digital processors to initiate performance of the processes. Any portions of the processes may be performed by the digital processors and/or other devices. For example, executing the instructions may cause the digital processors to perform actions that directly contribute to performance of the processes, and/or indirectly contribute to performance of the processes by causing (e.g., initiating) other hardware components to perform actions that directly contribute to the performance of the processes.

Any of the processes illustrated using the second set of shapes and interactions illustrated using the third set of shapes may be performed, in part or whole, by special purpose hardware components such as digital signal processors, application specific integrated circuits, programmable gate arrays, graphics processing units, data processing units, and/or other types of hardware components. These special purpose hardware components may include circuitry and/or semiconductor devices adapted to perform the processes. For example, any of the special purpose hardware components may be implemented using complementary metal-oxide semiconductor based devices (e.g., computer chips).

Any of the processes and interactions may be implemented using any type and number of data structures. The data structures may be implemented using, for example, tables, lists, linked lists, unstructured data, data bases, and/or other types of data structures. Additionally, while described as including particular information, it will be appreciated that any of the data structures may include additional, less, and/or different information from that described above. The informational content of any of the data structures may be divided across any number of data structures, may be integrated with other types of information, and/or may be stored in any location.

Figure 3:
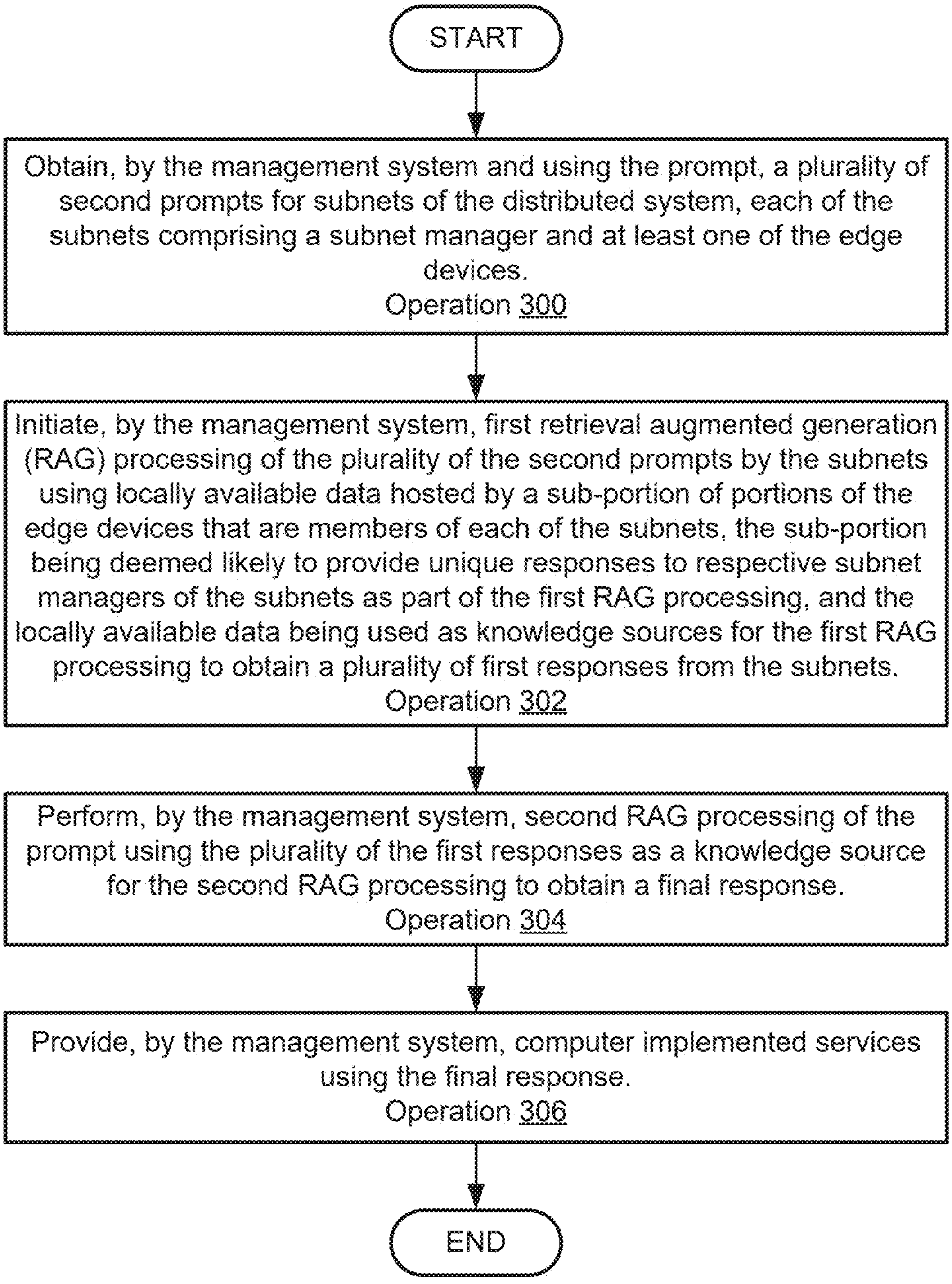
FIG. 3 shows a flow diagram illustrating at least one method in accordance with an embodiment.

As discussed above, the components of FIGS. 1A-1B may perform various methods to managing operation of a distributed system. FIG. 3 illustrates a method that may be performed by the components of the system of FIGS. 1A-1B. In the diagram discussed below and shown in FIG. 3, any of the operations may be repeated, performed in different orders, and/or performed in parallel with or in a partially overlapping in time manner with other operations.

Turning to FIG. 3, a flow diagram illustrating a method of managing the operation of the distributed system in accordance with an embodiment is shown. The method may be performed, for example, by any of the components of the system of FIGS. 1A-1B, and/or other components not shown therein.

At operation 300, a plurality of second prompts for subnets of the distributed system, each of the subnets comprising a subnet manager and at least one of the edge devices, may be obtained by the management system and using the prompt. The plurality of the second prompts may be derived by (i) performing at least one modification, based on at least one attribute and/or at least one capability of at least one edge device of the at least one subnet, to information of the prompt and/or (ii) generating, using the at least one modification of the information, the second prompts.

At operation 302, first retrieval augmented generation (RAG) processing may be initiated by the management system of the plurality of the second prompts by the subnets using locally available data hosted by a sub-portion of portions of the edge devices that are members of each of the subnets, the sub-portion being deemed likely to provide unique responses to respective subnet managers of the subnets as part of the first RAG processing, and the locally available data being used as knowledge sources for the first RAG processing to obtain a plurality of first responses from the subnets. The first RAG processing may be initiated by providing, by the management system, the plurality of the second prompts to respective subnet managers of the subnets to initiate generation and/or distribution of derived prompts to the sub-portion of the portions of the edge devices that are members of the respective subnets. The plurality of the second prompts may be provided by transmitting, by the management system and to each subnet manager of the subnet managers, a second prompt of the second prompts.

At operation 304, second RAG processing of the prompt may be performed by the management system using the plurality of the first responses as a knowledge source for the second RAG processing to obtain a final response. The second RAG processing may be performed by (i) rank ordering the plurality of first responses based on relevancy to the prompt and/or (ii) using a portion of the plurality of the first responses as indicated by the rank ordering as context data for the prompt. The second RAG processing may be further performed by ingesting, by a generative trained machine learning model, at least the plurality of the first responses, to generate the final response.

At operation 306, computer implemented services may be provided by the management system using the final response. The computer implemented services may be provided by providing information from (i) the notification, (ii) the recommendation, (iii) the result, etc. of the final response in a plan to (i) maintain, (ii) optimize, (iii) remediate, etc. at least one data processing system that is used to provide computer implemented services. The method may end following operation 306.

Thus, via the method shown in FIG. 3, embodiments herein may likely improve a likelihood of managing the operation of the distributed system. By improving the likelihood of managing the operation of the distributed system, the distributed system may be more likely to provide desirable computer implemented services by, for example, generating a final response to a prompt using information on at least one edge device of the sub-portion of the portions of the edge devices as a knowledge source, using the prompt to generate at least one second prompt to submit to the sub-portion of the portions of the edge devices that leverages at least one attribute, at least one capability, at least one data chunk, etc. of the at least one edge device of the sub-portion, etc.

Figure 4:
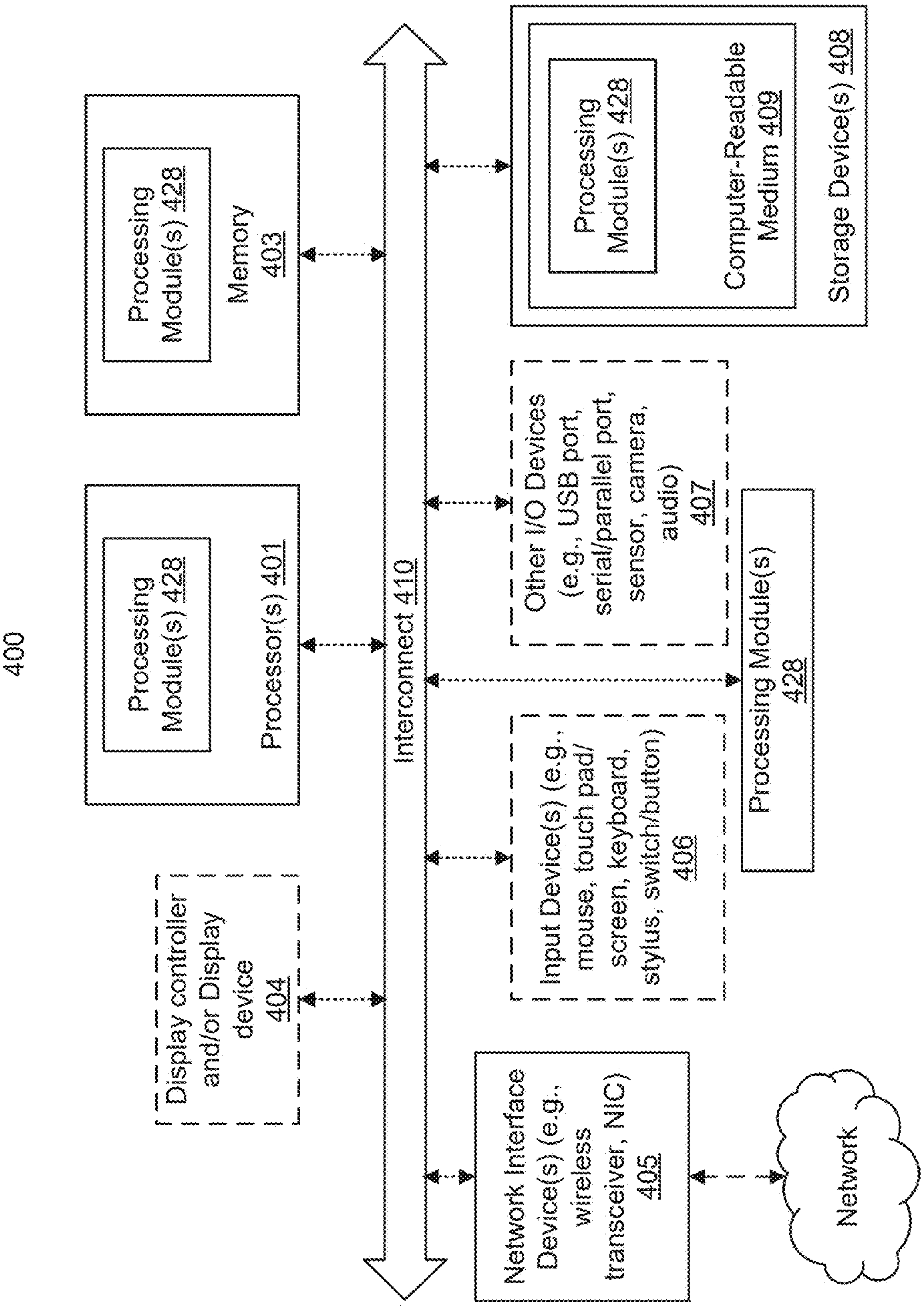
FIG. 4 shows a block diagram illustrating a data processing system in accordance with an embodiment.

Any of the components illustrated in FIGS. 1A-2D may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing operation of a distributed system, the method comprising:

based on a determination that a management system of the distributed system lacks sufficient information regarding edge devices of the distributed system to service a prompt submitted for processing by a first generative trained machine learning model hosted by the management system:

obtaining, by the management system and using the prompt, a plurality of second prompts for subnets of the distributed system, each of the subnets comprising a subnet manager and at least one of the edge devices;

initiating, by the management system, first retrieval augmented generation (RAG) processing of the plurality of the second prompts by the subnets using locally available data hosted by a sub-portion of portions of the edge devices that are members of each of the subnets, the sub-portion being deemed likely to provide unique responses to respective subnet managers of the subnets as part of the first RAG processing, and the locally available data being used as knowledge sources for the first RAG processing to obtain a plurality of first responses from the subnets;

performing, by the management system, second RAG processing of the prompt using the plurality of the first responses as a knowledge source for the second RAG processing to obtain a final response; and providing, by the management system, computer implemented services using the final response.

2. The method of claim 1, wherein a likelihood to provide the unique responses is based on historic responses provided by the sub-portion of the portions of the edge devices.

3. The method of claim 2, wherein the sub-portion to provide the unique responses is also based on computing resources availability of the portions of the edge devices so that any of the edge devices lacking a threshold level of available computing resources are not members of the sub-portion.

4. The method of claim 1, wherein each first response of the plurality of first responses is obtained from a corresponding one of the respective subnet managers of the subnets, and each of the respective subnet managers are adapted to use the sub-portion of the portions of the edge devices to generate a corresponding first response of the plurality of first responses.

5. The method of claim 4, wherein the respective subnet managers are further adapted to verify operation of the sub-portion of the portions of the edge devices by obtaining a response from at least one edge device of the edge devices that is deemed likely to provide a duplicative response to a response provided by an edge device of the sub-portion of the portions of the edge devices as part of the first RAG processing.

6. The method of claim 1, wherein initiating the first RAG processing comprises:

providing, by the management system, the plurality of the second prompts to respective subnet managers of the subnets to initiate generation and distribution of derived prompts to portions of the edge devices that are members of the subnets.

7. The method of claim 6, wherein the subnet manager is adapted to customize each of the derived prompts based on a designated recipient of each of the derived prompts.

8. The method of claim 7, wherein the subnet manager is further adapted to obtain sub-responses based on the derived prompts and generate one of the plurality of the first responses.

9. The method of claim 8, wherein the one of the plurality of first responses is based on a ranking of the derived prompts performed by the subnet manager based on ranking criteria that is different from other ranking criteria used by edge devices that are managed by the subnet manager.

10. The method of claim 1, wherein performing the second RAG processing comprises:

rank ordering the plurality of first responses based on relevancy to the prompt; and using a portion of the plurality of the first responses as indicated by the rank ordering as context data for the prompt.

11. A non-transitory machine-readable medium having instructions stored therein, which when executed by a processor, cause the processor to perform operations for managing operation of a distributed system, the operations comprising:

based on a determination that a management system of the distributed system lacks sufficient information regarding edge devices of the distributed system to service a prompt submitted for processing by a first generative trained machine learning model hosted by the management system:

obtaining, by the management system and using the prompt, a plurality of second prompts for subnets of the distributed system, each of the subnets comprising a subnet manager and at least one of the edge devices;

initiating, by the management system, first retrieval augmented generation (RAG) processing of the plurality of the second prompts by the subnets using locally available data hosted by a sub-portion of portions of the edge devices that are members of each of the subnets, the sub-portion being deemed likely to provide unique responses to respective subnet managers of the subnets as part of the first RAG processing, and the locally available data being used as knowledge sources for the first RAG processing to obtain a plurality of first responses from the subnets;

performing, by the management system, second RAG processing of the prompt using the plurality of the first responses as a knowledge source for the second RAG processing to obtain a final response; and providing, by the management system, computer implemented services using the final response.

12. The non-transitory machine-readable medium of claim 11, wherein a likelihood to provide the unique responses is based on historic responses provided by the sub-portion of the portions of the edge devices.

13. The non-transitory machine-readable medium of claim 12, wherein the sub-portion to provide the unique responses is also based on computing resources availability of the portions of the edge devices so that any of the edge devices lacking a threshold level of available computing resources are not members of the sub-portion.

14. The non-transitory machine-readable medium of claim 11, wherein each first response of the plurality of first responses is obtained from a corresponding one of the respective subnet managers of the subnets, and each of the respective subnet managers are adapted to use the sub-portion of the portions of the edge devices to generate a corresponding first response of the plurality of first responses.

15. The non-transitory machine-readable medium of claim 14, wherein the respective subnet managers are further adapted to verify operation of the sub-portion of the portions of the edge devices by obtaining a response from at least one edge device of the edge devices that is deemed likely to provide a duplicative response to a response provided by an edge device of the sub-portion of the portions of the edge devices as part of the first RAG processing.

16. A data processing system, comprising:

a processor; and a memory coupled to the processor to store instructions, which when executed by the processor, cause the processor to perform operations managing operation of a distributed system, the operations comprising:

based on a determination that a management system of the distributed system lacks sufficient information regarding edge devices of the distributed system to service a prompt submitted for processing by a first generative trained machine learning model hosted by the management system:

obtaining, by the management system and using the prompt, a plurality of second prompts for subnets of the distributed system, each of the subnets comprising a subnet manager and at least one of the edge devices;

initiating, by the management system, first retrieval augmented generation (RAG) processing of the plurality of the second prompts by the subnets using locally available data hosted by a sub-portion of portions of the edge devices that are members of each of the subnets, the sub-portion being deemed likely to provide unique responses to respective subnet managers of the subnets as part of the first RAG processing, and the locally available data being used as knowledge sources for the first RAG processing to obtain a plurality of first responses from the subnets;

performing, by the management system, second RAG processing of the prompt using the plurality of the first responses as a knowledge source for the second RAG processing to obtain a final response; and providing, by the management system, computer implemented services using the final response.

17. The data processing system of claim 16, wherein a likelihood to provide the unique responses is based on historic responses provided by the sub-portion of the portions of the edge devices.

18. The data processing system of claim 17, wherein the sub-portion to provide the unique responses is also based on computing resources availability of the portions of the edge devices so that any of the edge devices lacking a threshold level of available computing resources are not members of the sub-portion.

19. The data processing system of claim 16, wherein each first response of the plurality of first responses is obtained from a corresponding one of the respective subnet managers of the subnets, and each of the respective subnet managers are adapted to use the sub-portion of the portions of the edge devices to generate a corresponding first response of the plurality of first responses.

20. The data processing system of claim 19, wherein the respective subnet managers are further adapted to verify operation of the sub-portion of the portions of the edge devices by obtaining a response from at least one edge device of the edge devices that is deemed likely to provide a duplicative response to a response provided by an edge device of the sub-portion of the portions of the edge devices as part of the first RAG processing.

* * * * *